US010549284B2

(12) United States Patent
Green et al.

(10) Patent No.: US 10,549,284 B2
(45) Date of Patent: Feb. 4, 2020

(54) STRESS DISTRIBUTION ELEMENT FOR A GRINDING MILL SHELL

(71) Applicant: OUTOTEC (FINLAND) OY, Espoo (FI)

(72) Inventors: Nicholas John Green, Rivervale (AU); Jeffrey Victor Belke, Ardross (AU)

(73) Assignee: OUTOTEC (FINLAND) OY, Espoo (FI)

( * ) Notice: Subject to any disclaimer, the term of this patent is extended or adjusted under 35 U.S.C. 154(b) by 705 days.

(21) Appl. No.: 14/902,349

(22) PCT Filed: Jul. 8, 2014

(86) PCT No.: PCT/AU2014/000700
§ 371 (c)(1),
(2) Date: Dec. 31, 2015

(87) PCT Pub. No.: WO2015/003208
PCT Pub. Date: Jan. 15, 2015

(65) Prior Publication Data
US 2016/0121337 A1 May 5, 2016

(30) Foreign Application Priority Data

Jul. 8, 2013 (AU) ................................ 2013206749

(51) Int. Cl.
*B02C 17/18* (2006.01)
*F16B 5/00* (2006.01)
(52) U.S. Cl.
CPC ............ *B02C 17/18* (2013.01); *F16B 5/0004* (2013.01)

(58) Field of Classification Search
CPC .......... B02C 17/18; B02C 2/04; F16B 5/0004
(Continued)

(56) References Cited

U.S. PATENT DOCUMENTS 924,439 A * 6/1909 Dorn et al. ............. B02C 17/18
241/124
943,747 A * 12/1909 Hickman ...................... 248/511
(Continued)

FOREIGN PATENT DOCUMENTS

| GB | 750584 A | 6/1956 |
| GB | 1 385 970 A | 3/1975 |
| WO | WO 2013/021821 A1 | 2/2013 |

OTHER PUBLICATIONS

International Search Report (PCT/ISA/210) dated Sep. 30, 2014, by the Australian Patent Office as the International Searching Authority for International Application No. PCT/AU2014/000700.
(Continued)

*Primary Examiner* — Shelley M Self
*Assistant Examiner* — Smith Oberto Bapthelus
(74) *Attorney, Agent, or Firm* — Buchanan, Ingersoll & Rooney PC

(57) ABSTRACT

Provided is a stress distribution element for a mill shell joint, comprising an elongated body having a proximal end and a distal end. The elongated body varies in one dimension from the proximal end to the distal end to distribute stress forces from the proximal end to the distal end. The invention also provides a stress distribution system, a stress distribution assembly, a mill shell section, a mill shell and a method of distributing stress incorporating the stress distribution element.

7 Claims, 10 Drawing Sheets

(58) Field of Classification Search
USPC .................................... 241/156, 179, 285.1
See application file for complete search history.

(56) References Cited

U.S. PATENT DOCUMENTS

| | | | | | |
|---|---|---|---|---|---|
| 1,741,744 | A * | 12/1929 | Taylor | ................ | F23K 3/12 110/328 |
| 1,807,034 | A * | 5/1931 | Hardinge | ................ | B02C 17/18 241/182 |
| 1,843,000 | A * | 1/1932 | Rich | ................ | F23K 3/12 110/182.5 |
| 2,044,734 | A * | 6/1936 | Newhouse | ................ | C21D 9/50 219/50 |
| 2,579,238 | A * | 12/1951 | Lippmann | ................ | B02C 2/04 184/6.18 |
| 2,860,837 | A * | 11/1958 | Werner | ................ | B02C 2/04 241/285.1 |
| 3,010,661 | A * | 11/1961 | Weston | ................ | B02C 17/04 241/171 |
| 3,126,590 | A * | 3/1964 | Monti | ................ | F25D 23/087 49/478.1 |
| 3,194,527 | A * | 7/1965 | Gruss | ................ | A47B 96/06 248/220.1 |
| 3,214,829 | A * | 11/1965 | Isenbarger | ................ | B25B 27/02 29/254 |
| 3,868,064 | A * | 2/1975 | Coulter | ................ | B02C 13/16 241/186.4 |
| 4,091,594 | A * | 5/1978 | Yamashita | ................ | E04B 1/2403 52/283 |
| 4,505,367 | A * | 3/1985 | Martin | ................ | F16D 35/022 192/30 V |
| 4,702,425 | A * | 10/1987 | McConnell, Jr. | ................ | B02C 2/042 241/156 |
| 4,825,621 | A * | 5/1989 | Jensen | ................ | E04B 1/2608 403/232.1 |
| 5,083,714 | A * | 1/1992 | Vendelin | ................ | B02C 13/286 241/275 |
| 5,419,278 | A * | 5/1995 | Carter | ................ | B01L 3/06 117/206 |
| 5,474,239 | A * | 12/1995 | Williams, Jr. | ................ | B02C 18/146 241/224 |
| 6,073,405 | A * | 6/2000 | Kasai | ................ | E04B 1/2403 403/270 |
| 6,857,808 | B1 * | 2/2005 | Sugimoto | ................ | E04B 1/2403 403/41 |
| 2002/0100229 | A1 | 8/2002 | Chen et al. | | |
| 2008/0210797 | A1 * | 9/2008 | Hagedorn | ................ | B02C 17/04 241/294 |
| 2009/0047565 | A1 * | 2/2009 | Terasaki | ................ | H01M 8/026 429/415 |
| 2014/0166648 | A1 * | 6/2014 | Iwashita | ................ | B65D 90/024 220/4.01 |
| 2016/0121337 | A1 * | 5/2016 | Green | ................ | F16B 5/0004 241/179 |
| 2017/0304837 | A1 * | 10/2017 | Lauermaa | ................ | B02C 17/225 |

OTHER PUBLICATIONS

International Preliminary Report on Patentability (PCT/IPEA/409) dated Jul. 16, 2015 for International Application No. PCT/AU2014/000700.

Office Action issued by the Eurasian Patent Office in corresponding Eurasion Patent Application No. 201592288/31 dated Jul. 31, 2017 (5 pages including partial English translation).

Office Action dated Nov. 11, 2018, by the Chilean Patent Office in corresponding Chilean Patent Application No. 201600014. (11 pages).

Communication pursuant to Article 94(3) EPC issued by the European Patent Office in corresponding European Patent Application No. 14823387.7-1018 dated Oct. 16, 2018 (4 pages).

Extended Search Report issued by the European Patent Office in corresponding European Patent Application No. 14823387.7 dated Feb. 6, 2017 (6 pages).

* cited by examiner

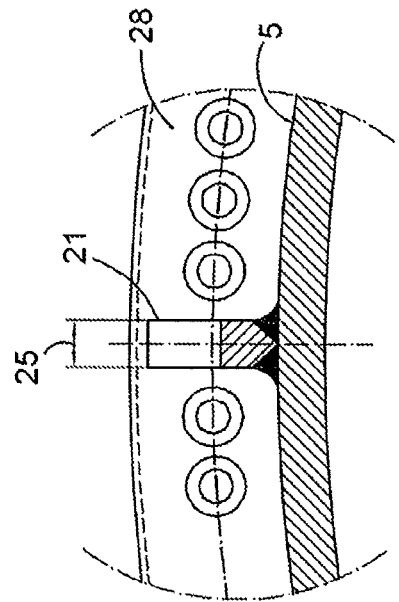
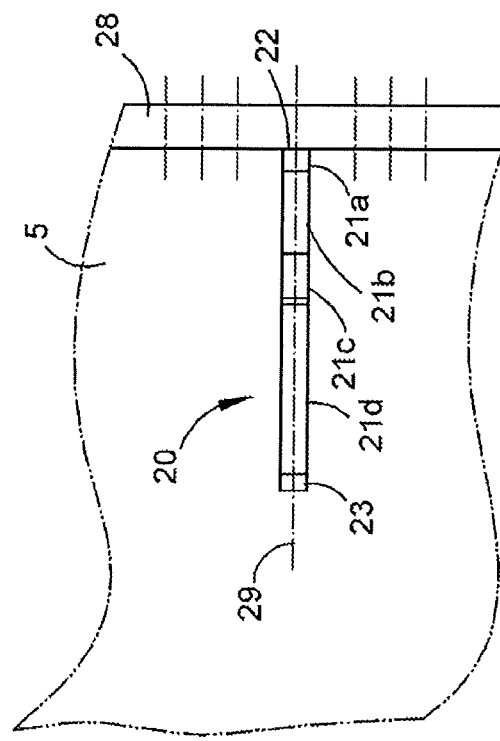
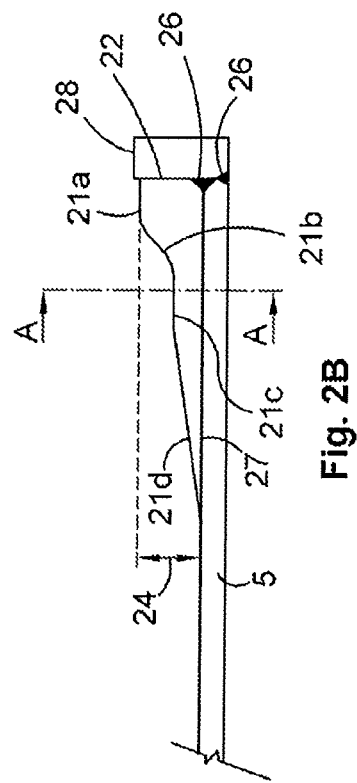

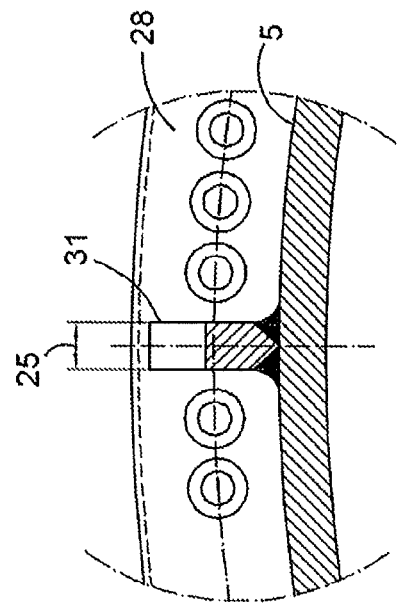
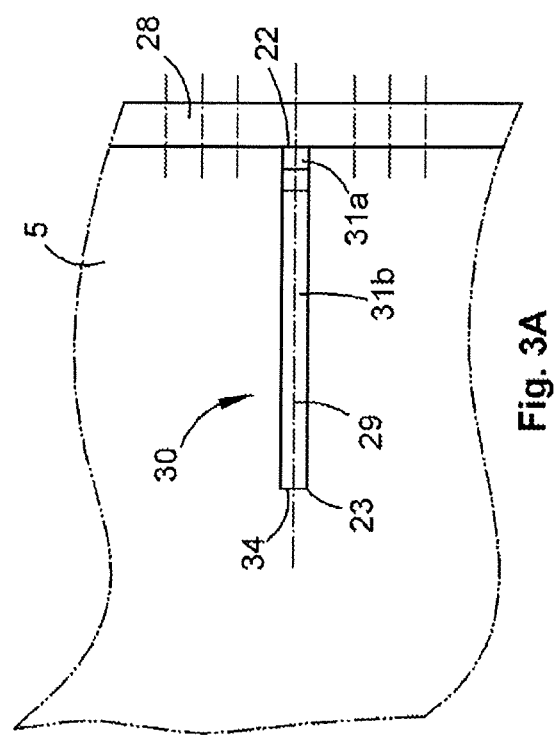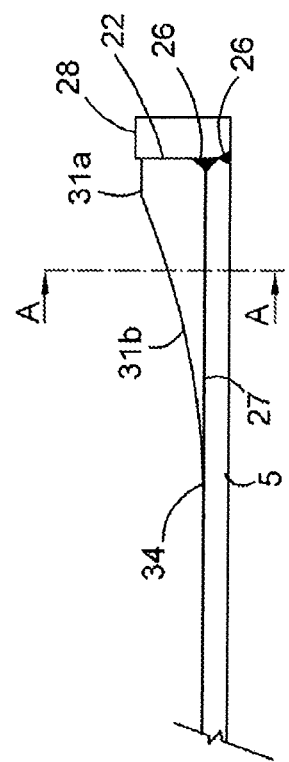

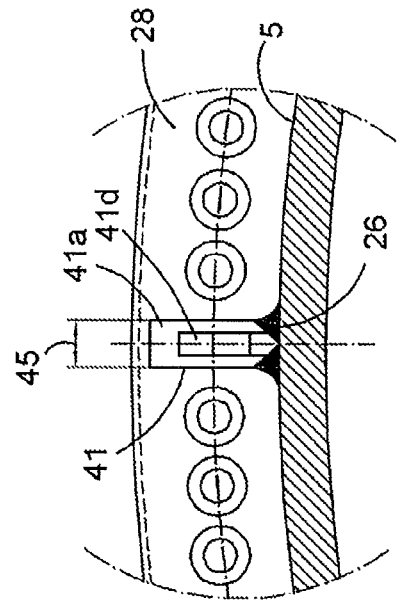
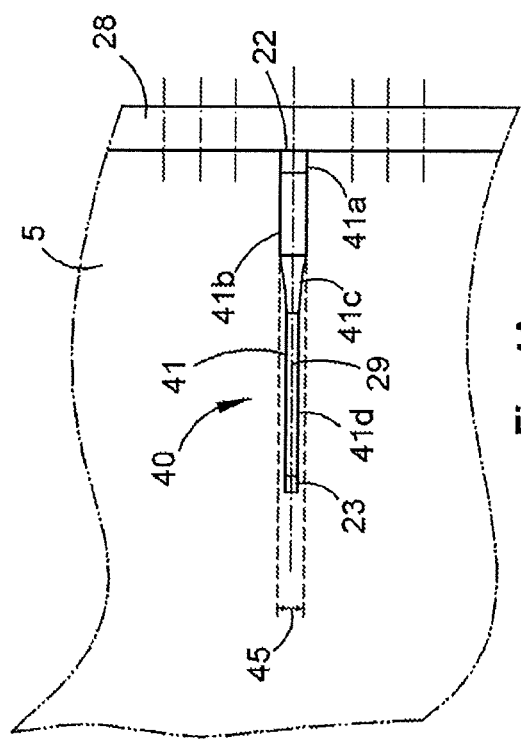
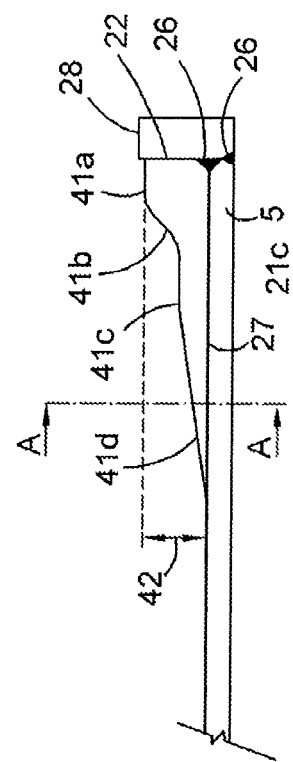

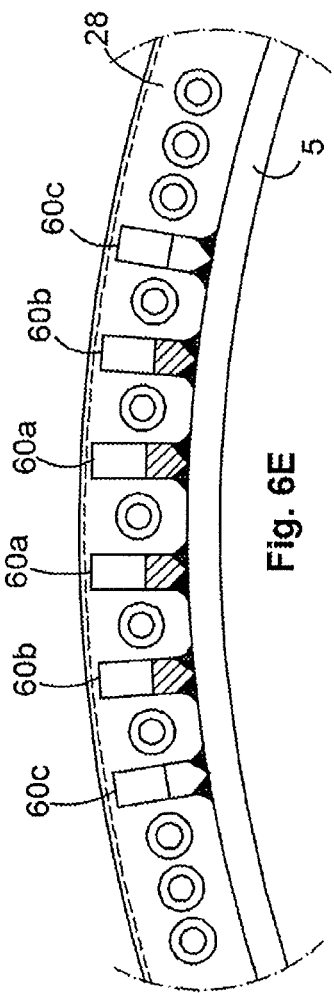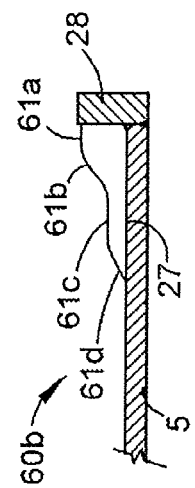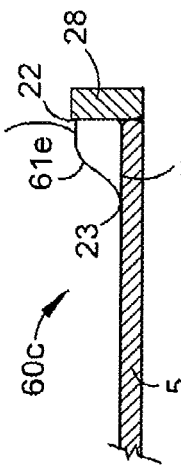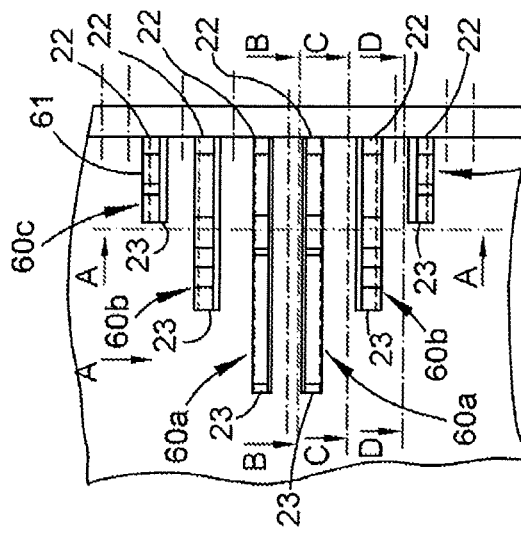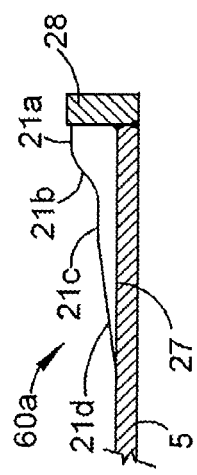

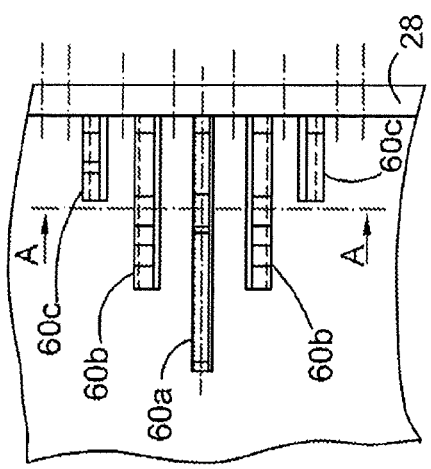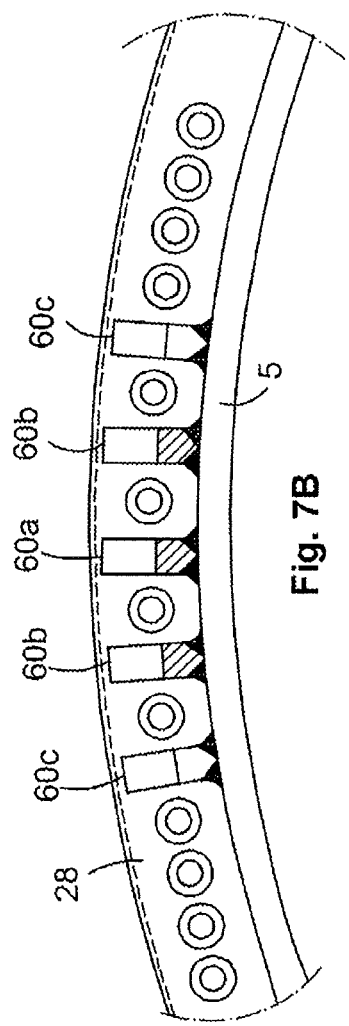

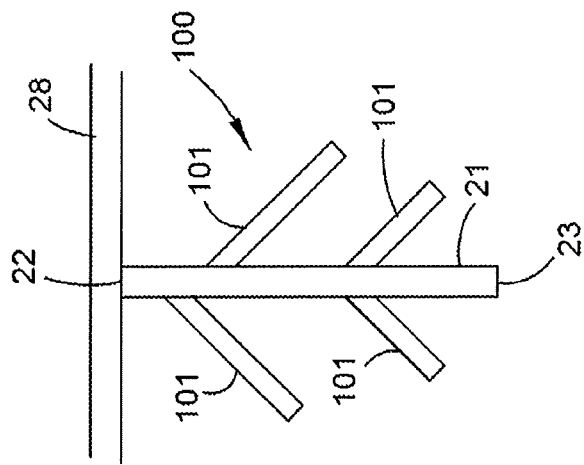
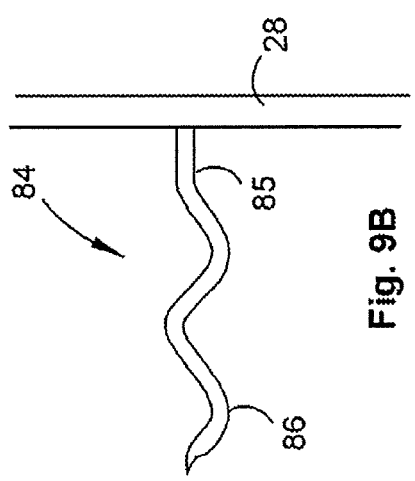
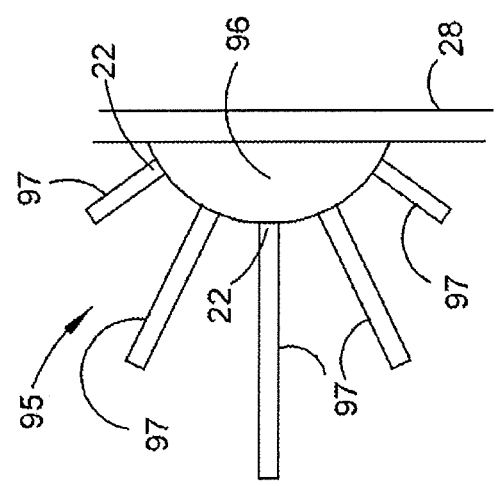
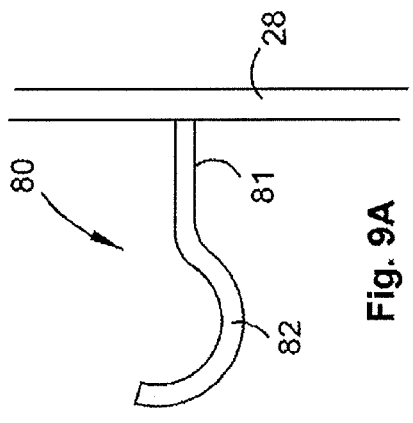
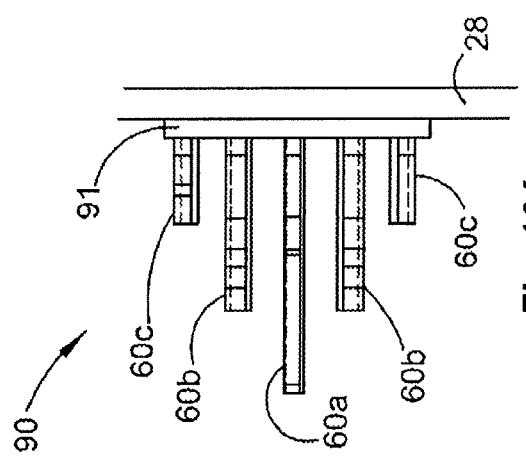

STRESS DISTRIBUTION ELEMENT FOR A GRINDING MILL SHELL

FIELD OF THE INVENTION

The present invention relates to a stress distribution element for a mill shell and in a particular a stress distribution element for use in a mill. The invention has been developed primarily for use as stress distribution element for joints in grinding mill shells and will be described hereinafter by reference to this application. However, it will be appreciated that the invention is not limited to this particular field of use, but also extends to other types of structures that require attenuation of stresses along joints and seams.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

A grinding mill has a generally cylindrical mill chamber called a mill body or "shell" and two journal shafts, the journals being mounted upon supports for rotation. Large scale ball mills, typically more than 24' in diameter and 40' in length, are generally constructed by dividing the mill shell into individual components called "shell sections", whereby the shell sections have "joints" between adjoining sections for facilitating later assembly on-site. The division of the mill shell into modular shell sections assists in the manufacture and transportation of the mill to the plant site. Depending on the size of the mill shell, there may be numerous splits in the lengthwise direction, each lengthwise split differentiating one shell "can" from the next shell "can". Each shell can comprise one-half, one-third or one quarter of the mill shell diameter. Each shell section has at least one connecting element in the form of a flange that extends along at least one edge of each shell section. The flanges can either be longitudinal flanges or circumferential flanges, the former extending parallel to the longitudinal axis of the mill shell when assembled while the latter extend around the circumference of the mill shell. The mill shell is assembled by aligning the respective flanges of adjacent shell section and bolting them together to form what is generally known as a "split flange".

A disadvantage of these split flanges is that there is frequently a significant amount of stress in the vicinity of the shell flange connection where a split flange meets another split flange. For example, a longitudinal split flange joining two shell sections is then connected to circumferential flange on a third shell section. This creates a "hard spot" which concentrates the stresses in the flanges in one area. As the longitudinal flange is typically quite stiff and thick, it causes a large load at the hard spot due to a sudden change in thickness of the joint where the longitudinal flange meets the circumferential flange, thus creating the concentrated area of high stress. The presence of hard spots adversely affects joint integrity, may cause cracking in the mill shell and eventually results in long term mill failure. High stress areas may also be created by other non-axisymmetric geometrical structural elements or discontinuities on the shell section, such as steps in thickness or man-holes which cause an increase in stress. A high stress can also form where the mill head is also split. This hard spot problem is exacerbated in large scale grinding mills discussed above, including ball mills, as the relative difference in stiffness caused by split flanges is greater due to a generally less stiff structure with increasing diameter. A greater length also reduces the global mill stiffness together with increasing the bending moment.

To address this issue, some mill manufacturers increase the mass of the shell section to reduce the impact of the stress concentrations resulting from hard spots arising from split flanges and other non-axisymmetric structural elements. Other mill manufacturers ignore the impact altogether and design as if there were no stress raisers. The former path has obvious disadvantages in increasing the mass of the mill and hence its manufacturing cost, but is technically superior to the latter path. The latter path results in a large mill with a lighter mass, but has stresses of an unknown magnitude in one or more critical locations, thus running the risk of stresses exceeding the allowable level and the abovementioned problems of mill shell cracking and long term mill failure. As mills of the size discussed have only been put into service in relatively recent years, these risks are not evident as yet and may only surface in the long term.

It is an object of the present invention to overcome or substantially ameliorate one or more of the disadvantages of prior art, or at least to provide a useful alternative.

It is an object of the invention in at least one preferred form to provide a stress distribution element for a mill shell section that minimises the effect of high stresses at concentrated areas or hard spots where longitudinal and/or circumferential flanges of adjacent mill shell sections meet, and a method for distributing stress from a joint using the stress distribution element.

SUMMARY OF THE INVENTION

According to a first aspect of the invention, there is provided a stress distribution element for a joint of a mill shell, comprising an elongated body having a proximal end for connecting said distribution element to said mill shell joint and a distal end, wherein said elongated body varies in one dimension from said proximal end to said distal end to widely distribute stresses from said proximal end to said distal end.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Preferably, said elongated body has a variable height from said proximal end to said distal end. More preferably, said elongated body decreases in height from said proximal end to said distal end. In one preferred form, there is a gradual decrease in the height of said elongated body from said proximal end to said distal end. In another preferred form, there is a step-wise decrease in the height of said elongated body from said proximal end to said distal end. In yet another preferred form, said elongated body comprises at least one tapered portion.

Preferably, said elongated body has a substantially uniform thickness in its width.

Preferably, said elongated body has a variable width from said proximal end to said distal end. More preferably, said elongated body decreases in width from said proximal end to said distal end.

Preferably, said elongated body has a rib-like or fin-like profile.

Preferably, said elongated body has a partly curved or sinuous profile.

Preferably, said elongated body further comprises a connecting side for connecting said elongated body along its length to said mill shell section. More preferably, said elongated body comprises a distal side opposite to said connecting side.

Preferably, said mill shell joint comprises at least one longitudinal flange connected to at least one circumferential flange, said at least one longitudinal flange extending parallel to the longitudinal axis of said mill shell and said at least one circumferential flange extending along the circumference of said mill shell, and said proximal end is connectable to said joint so that the longitudinal axis of said elongated body is coincident with or parallel to the longitudinal axis of said at least one longitudinal flange. More preferably, said proximal end is connected to a junction between said at least one longitudinal flange and said at least one circumferential flange.

A second aspect of the present invention provides a stress distribution system for a joint of a mill shell, comprising a plurality of stress distribution elements of the first aspect of the present invention, wherein said stress distribution elements are connectable at their respective proximal ends to said mill shell joint.

Preferably, said stress distribution elements extend substantially parallel to each other. Alternatively, said stress distribution elements extend substantially divergently from said mill shell joint.

A third aspect of the invention provides a stress distribution assembly for a joint of a mill shell, comprising a hub and a plurality of stress distribution elements of the first aspect of the present invention, wherein said hub is joined to the respective proximal ends of each said stress distribution element, said hub being connectable to said mill shell joint.

Preferably, said stress distribution elements extend substantially parallel to each other from said hub. Alternatively, said stress distribution elements extend substantially divergently from said hub.

A fourth aspect of the present invention provides a mill shell section comprising:
  an arcuate outer surface;
  a flange connected to said outer surface for connecting said mill shell section to another mill shell section, and
  one or more stress distribution elements of the first aspect of the present invention, the stress distribution system of the second aspect of the present invention or the stress distribution assembly of the third aspect of the present invention, wherein said proximal end of each said stress distribution element or said hub of said stress distribution assembly is connected to said flange.

Preferably, said flange is an arcuate flange.

A fifth aspect of the present invention provides a mill shell comprising:
  a plurality of mill shell sections connected together, each of said mill shell sections having an arcuate outer surface and at least one flange connected to said outer surface for connecting adjacent mill shell sections together said mill shell section to another mill shell section, and
  one or more stress distribution elements of the first aspect of the present invention, the stress distribution system of the second aspect of the present invention or the stress distribution assembly of the third aspect of the present invention,
  wherein two of said mill shell sections each have respective linear flanges connected together to form a longitudinal flange extending parallel to the longitudinal axis of said mill shell and respective arcuate flanges for connecting said two mill shell sections to a third mill shell section;
  said third mill shell section comprising an arcuate flange connected to said respective arcuate flanges of said two mill shell sections to form a circumferential flange extending along the circumference of said mill shell, and
  wherein said longitudinal flange and said circumferential flange are connected to each other to form a mill shell joint and said proximal end of each said stress distribution element or said hub of said stress distribution assembly is connected to said mill shell joint to distribute stress forces from said mill shell joint.

Preferably, said proximal end is connected to said mill shell joint so that the longitudinal axis of said elongated body of each said stress distribution element or each said elongated body of said stress distribution assembly is coincident with or parallel to the longitudinal axis of said longitudinal flange. Preferably, where the stress distribution assembly comprises stress distribution elements extending parallel to each other from said hub, said hub is connected to said mill shell joint so that the longitudinal axis of said elongated body of said stress distribution element or each said elongated body of said stress distribution assembly is coincident with or parallel to the longitudinal axis of said longitudinal flange.

Preferably, said elongated body of each said stress distribution element or each said elongated body of said stress distribution assembly is connected to said third mill shell section.

Preferably, said proximal end or said hub is connected to said circumferential flange. More preferably, said proximal end or said hub is connected to said circumferential flange at one side opposite to said longitudinal flange.

Preferably, said proximal end or said hub is connected to a junction between said longitudinal flange and said circumferential flange.

Preferably, said elongated body of said stress distribution element or each said elongated body of said stress distribution assembly is connected to said third mill shell section. More preferably, said elongated body of said stress distribution element or each said elongated body of said stress distribution assembly further comprises a connecting side for connecting said elongated body or each said elongated body along its or their respective lengths to said third mill shell section.

An aspect of the present invention provides a method of distributing stress from a joint of a mill shell, said method comprising connecting one or more stress distribution elements of the first aspect of the present invention, the stress distribution system of the second aspect of the present invention or the stress distribution assembly of the third aspect of the present invention by their respective proximal ends or said hub to said mill shell joint.

BRIEF DESCRIPTION OF THE DRAWINGS

Preferred embodiments of the invention will now be described, by way of example only, with reference to the accompanying drawings in which:

FIG. 2A is a plan view of the stress distribution element of FIG. 1;

FIG. 2B is a side view of the stress distribution element of FIG. 1;

FIG. 2C is a front view of the stress distribution element of FIG. 1;

FIG. 3A is a plan view of a stress distribution element according to a second embodiment of the invention;

FIG. 3B is a side view of the stress distribution element of FIG. 3A;

FIG. 3C is a front view of the stress distribution element of FIG. 3A;

FIG. 4A is a plan view of a stress distribution element according to a third embodiment of the invention;

FIG. 4B is a side view of the stress distribution element of FIG. 4A;

FIG. 4C is a front view of the stress distribution element of FIG. 4A;

FIG. 6A is a plan view of a stress distribution assembly for a mill shell section according to a fifth embodiment of the invention;

FIGS. 6B to 6D are side views of the stress distribution elements of the assembly of FIG. 6A;

FIG. 6E is a front view of the stress distribution assembly of FIG. 6A;

FIG. 7A is a plan view of a stress distribution assembly according to a sixth embodiment of the invention;

FIG. 7B is a side view of the stress distribution assembly of FIG. 7A;

FIGS. 9A and 9B are a plan views of stress distribution elements according to seventh and eighth embodiments of the invention;

FIGS. 10A and 10B are plan views of stress distribution assemblies according to ninth and tenth embodiments of the invention, and FIG. 11 is a plan view of a stress distribution elements according to an eleventh embodiment of the invention.

PREFERRED EMBODIMENTS OF THE INVENTION

Figure 1:
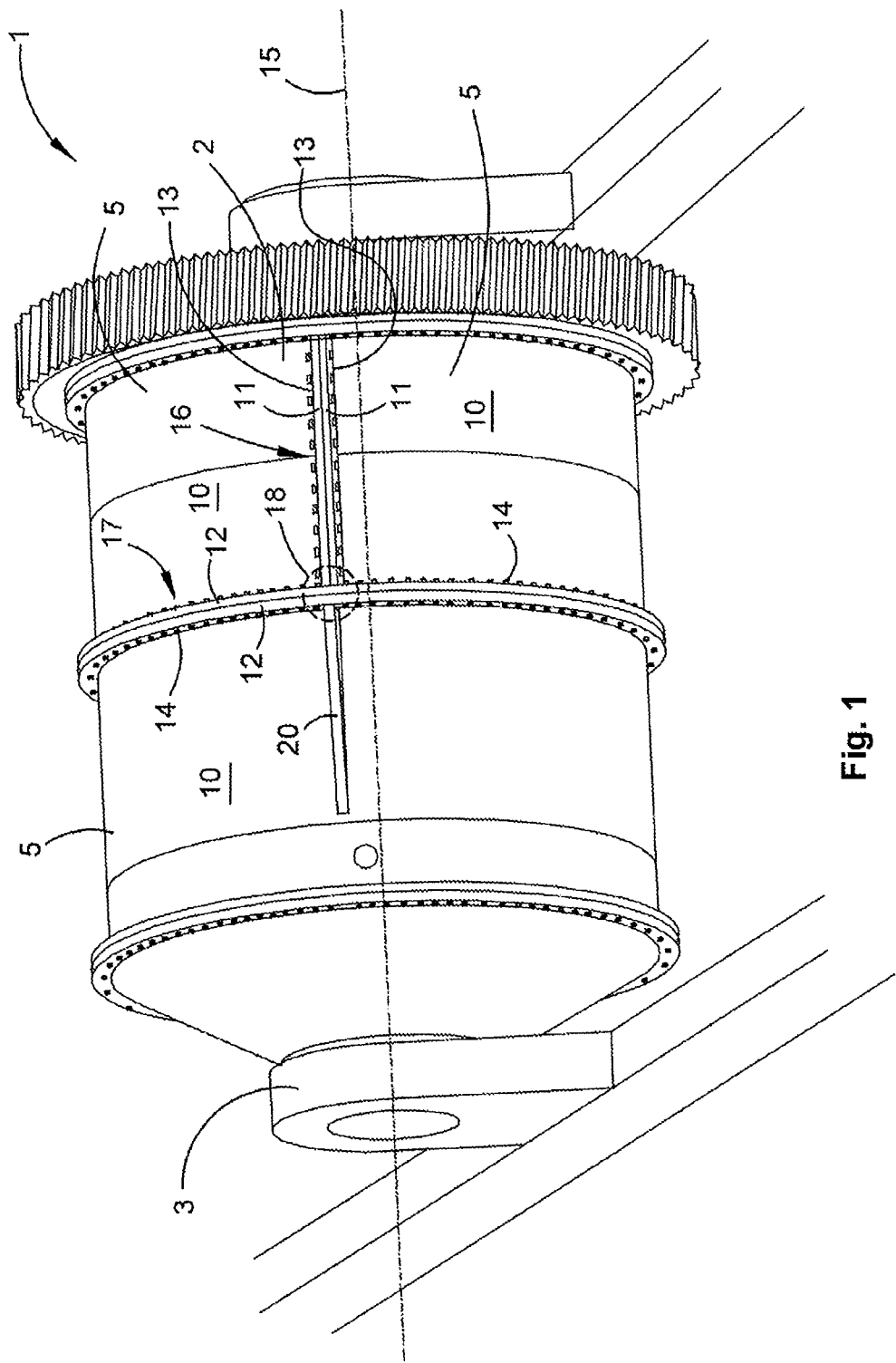
FIG. 1 is a side view of a grinding mill for receiving a stress distribution element according to a first embodiment of the invention.

Referring to FIG. 1, a typical grinding mill 1 comprises a milling chamber or body known as a "shell" 2 rotatably mounted on supports 3 via journal shafts 4 and bearing assemblies (not shown). The mill shell 2 is made up of modular components in the form of individual mill shell sections 5 that are connected or joined together. Depending on the size of the mill shell, there may be between four, six or eight shell sections, with each shell section comprising one-half of the mill shell diameter so that two shell sections forming one half (lengthwise) of the mill shell. In other configurations, the mill shell can be split into two, three or four sections lengthwise and then each of those sections in 180°, 120° or 90° segments, respectively.

The mill shell sections 5 are generally arcuate or curved with corresponding arcuate or curved outer surfaces 10. The mill shell sections 5 are connected or joined via longitudinal flanges 11 and/or circumferential flanges 12 that respectively extend either along a longitudinal edge 13 or around an arcuate or curved edge 14 of each shell section. Longitudinal flanges extend parallel to the longitudinal axis 15 of the mill shell 2 when the mill shell is assembled. Circumferential flanges extend around the circumference of the mill shell when the mill shell is assembled. Respective longitudinal and circumferential flanges of adjacent shell sections 5 are aligned and then connected or joined together (typically using bolts or studs) to form a joint called a "split flange" of the assembled mill shell 2.

As best shown in FIG. 1, frequently a split longitudinal flange 16 terminates at a split circumferential flange 17 where three mill shell sections 5 are connected together along their respective longitudinal and circumferential flanges. This creates a "hard spot" generally indicated by 18, where there is a concentration of stress due to the sudden change in stiffness from the split longitudinal flange 16 to the split circumferential flange 17 extending transversely to the split longitudinal flange. A stress distribution element in the form of a "dummy flange" 20 is provided according to a first embodiment of the present invention to alleviate the adverse effects of such hard spots by distributing the stress or load at the hard spot along its length, evenly distributing the load.

Referring to FIG. 2A, the stress distribution element 20 is shown in more detail and comprises an elongated body 21 having a proximal end 22 for connecting the distribution element to the mill shell joint formed by the split longitudinal flange 16 and the split circumferential flange 17. The elongated body 21 also has a distal end 23, and varies in one dimension from the proximal end 22 to the distal end to distribute stress forces from the proximal end to the distal end. In this first embodiment, that dimension is the height 24 of the elongated body 21. In other words, the elongated body 21 has a variable height 24 from the proximal end 22 to the distal end 23.

As best shown in FIG. 2B, the elongated body 21 decreases in height 24 from the proximal end 22 to the distal end 23. The decrease in height (and hence "thickness" in this dimension) can be achieved by step-wise decreases, smooth transitions, gradual decreases or any combination of these options. Gradual decreases or smooth transitions can be either non-linear, such as a curved or arcuate profile, or linear, such as a taper. In this particular embodiment, the decrease in height 24 is a mixture of both step-wise decreases and smooth transitions or gradual decreases. From the proximal end 22, a first portion or section 21a has an initial maximum height, followed by a non-linear decrease at a second portion 21b in the form of a sinuous curve, then a third portion 21c of uniform height and finally a linear decrease at a fourth portion 21d in the form of a tapered portion.

As best shown in FIG. 2C, while the height 24 of the elongated body 21 changes from the proximal end 22 to the distal end 23, the elongated body 21 still has a substantially uniform thickness in its width 25.

As best shown in FIG. 2B, the elongated body 21 at its proximal end 23 and a connecting side 27 are connected to a circumferential flange 28 of the mill shell section 5 (which is one half of a split circumferential shell section) and the mill shell section outer surface 10.

As best shown in FIG. 1, the dummy flange 20 is connected to the circumferential flange 28 so that it is located at or adjacent to a junction between the split longitudinal flange 16 and the circumferential flange 17. The dummy flange 20 is also arranged so that the elongated body 21 is coincident with the longitudinal axis 29 of the split longitudinal flange 16, preferably by having its longitudinal axis 29 in alignment or coincident with the longitudinal axis of the split longitudinal flange 16. The structure of the dummy flange 20 with its variances in height results in a controlled stiffness that permits the dummy flange to evenly distribute the stress over the joint formed by the split longitudinal and split circumferential flanges, thus effectively removing or reducing the hard spot and redistributing the load (stress) carried by the split longitudinal flange 16.

Generally, the variances in height of the dummy flange 20 over its length from the proximal end 22 to its distal end 23 will depend on the stiffness of the adjoining geometry of the split flange, which may be unique for every combination of mill diameter, length, flange dimension and shell section thickness. However, the geometry of the dummy flange is preferably adjusted so that its stiffness reduces most swiftly in the unwelded areas or sections where higher stress can be accepted (generally, the "free", unattached or distal side opposite the connecting side 27, comprising the curved portion 21b, flat portion 21c and tapered portion 21d) and then blends smoothly where there is welding along its connecting side 27 and its proximal end 22. This ensures the load (stress) is distributed with efficient use of material. The height and length (and hence profile) can thus be modified or adjusted to accommodate the stiffness of the adjoining geometry of the joint formed by the split longitudinal and circumferential flanges 16, 17. The inventors have discovered that the stiffness of the dummy flange 20 (via its variable dimension such as height and/or width) can be balanced or fine tuned using advanced finite element analysis (FEA) techniques to achieve the desired even distribution of stress.

Referring to FIGS. 3A to 3C, a second embodiment of the invention in the form of dummy flange 30 is illustrated where corresponding features have been given the same reference numerals. In this embodiment, the elongated body 31 has a gradual decrease in the height from the proximal end 22 to the distal end 23. There is an initial maximum height 32 at a first portion 31a, followed by a smooth transition to a base 34 at a second portion 31b in the form of a curved, tapering portion, as best shown in FIG. 3B. The width 25 is also substantially uniform along the length of the elongated body 31 from its proximal end 22 to its distal end 23, as best shown in FIG. 3C.

Referring to FIGS. 4A to 4C, a third embodiment of the invention in the form of dummy flange 40 is illustrated where corresponding features have been given the same reference numerals. In this embodiment, the elongated body 41 has a combination of different gradual decreases in the height from the proximal end 22 to the distal end 23. There is an initial maximum height 42 at a first portion 41a, followed by a non-linear decrease at a second portion 41b in the form of a sinuous portion, then a flat portion 41c and finally a tapered portion 41d, as best shown in FIG. 4B. Unlike the previous two embodiments, the elongated body 41 also has a decreasing width 45 along its length from its proximal end 22 to its distal end 23, as best shown in FIGS. 4A and 4C. The elongated body 41 has an initial maximum width for portions 41a and 41b. The elongated body 41 then narrows in width at portion 41c by way of a curved transition or taper. The same width is then maintained for the portion 41d.

Figure 5C:
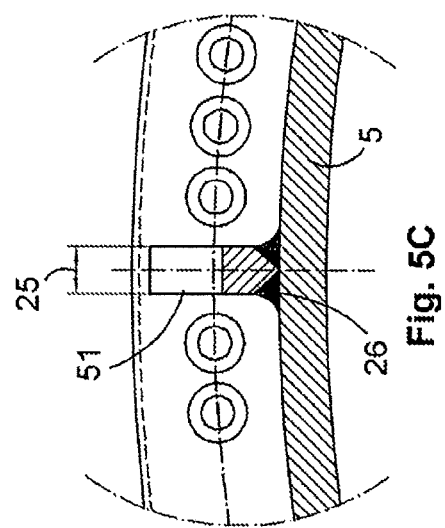
FIG. 5C is a front view of the stress distribution element of FIG. 5A.
Figure 5A:
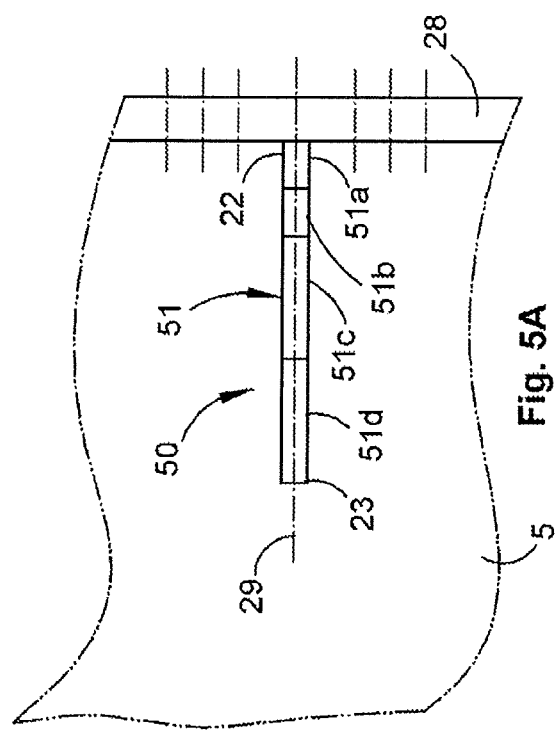
FIG. 5A is a plan view of a stress distribution element according to a fourth embodiment of the invention.
Figure 5B:
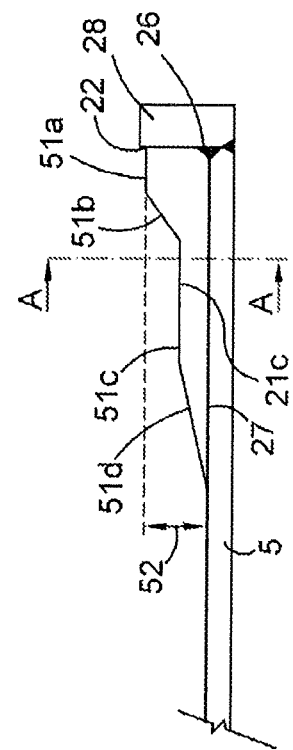
FIG. 5B is a side view of the stress distribution element of FIG. 5A.

Referring to FIGS. 5A to 5C, a fourth embodiment of the invention in the form of dummy flange 50 is illustrated where corresponding features have been given the same reference numerals. In this embodiment, the elongated body 51 has a gradual decrease in the height from the proximal end 22 to the distal end 23. There is an initial maximum height 52 at a first portion 51a, followed by a linear decrease in the form of a tapered portion, followed by a flat portion 51c and finally another linear decrease in the form of another tapered portion 51d, as best shown in FIG. 5B. The width 55 is also substantially uniform along the length of the elongated body 51 from its proximal end 22 to its distal end 23, as best shown in FIG. 5C.

The second, third and fourth embodiments work in the same way as the first embodiment described above and so will not be repeated. In other preferred forms, the elongated body has a step-wise decrease in the height of said elongated body from the proximal end to the distal end. This can take the form of a series of descending step portions from the proximal end to the distal end.

In another preferred form, the elongated body has a variable width from the proximal end to the distal end, similar to the decreases in width from the proximal end to the distal end in the third embodiment illustrated in FIGS. 4A to 4C, but with no variation in its height.

Referring to FIGS. 6A to 6E, a fifth embodiment of the invention is illustrated where corresponding features have been given the same reference numerals. In this fifth embodiment, there is a plurality of dummy flanges 60 connected at their respective proximal ends 22 to the circumferential flange 28. The dummy flanges are arranged so that there are at least two dummy flanges of the same or equal length, with dummy flanges 60a being the same length, dummy flanges 60b being the same length and dummy flanges 60c being the same length. Each pair of dummy flanges is also of a different length to the other pairs of dummy flanges. In this case, dummy flanges 60a are the longest, dummy flanges 60b are shorter in length and dummy flanges 60c are the shortest. Each pair of dummy flanges also has a variable height 24 but uniform width 25, as best shown in FIGS. 6B to 6E.

The dummy flanges 60a have an identical profile to the first embodiment illustrated in FIGS. 2A to 2C and so its description will not be repeated. The dummy flanges 60b gradually decrease in height, starting with a first portion 61a at the proximal end 22 that is followed by a sinuous or curved portion 61b, then a flat portion 61c and finally a curved portion 61d that terminates at the distal end 23. The dummy flanges 60c decreases in height more rapidly than the other dummy flanges 60a, 60b due to their relative short length, having a first portion 61a at the proximal end 22 and then a curved portion 61e that terminates at the distal end 23.

The dummy flanges 60a, 60b, 60c are arranged so that the longest dummy flanges 60a are substantially parallel to each other and are close or adjacent to the hard spot, where the split circumferential flange 17 (one half of which is formed by the circumferential flange 28) meets a split longitudinal flange 16. The other dummy flanges 60b, 60c of progressively shorter length are also arranged on either side of the dummy flanges 60a. This arrangement of the dummy flanges 60a, 60b, 60c further distributes stress forces away from the hard sport and thus attenuate their adverse effects on the joint integrity.

A sixth embodiment of the invention is illustrated in FIGS. 7A to 7B, where corresponding features have been given the same reference numerals. In this sixth embodiment, the arrangement of the dummy flanges 60a, 60b, and 60c of FIGS. 6A to 6E has been altered by removing one dummy flange 60a so that there are dummy flanges 60b, 60c of progressively shorter length on either side of the dummy flange 60a. Again, the dummy flanges are arranged substantially parallel to each other and close or adjacent to the hard spot. In this case, the dummy flange 60a would be situated so that it is substantially aligned with the split longitudinal flange 16 that would be formed on the other side of the circumferential flange 28. That is, the dummy flange 60a is coincident with the longitudinal axis of the split longitudinal flange 16 (and hence the other dummy flanges 60b, 60c are parallel to this longitudinal axis).

An example of the second embodiment will now be described with reference to FIGS. 8A and 8B, where corresponding features have been given the same reference numerals.

EXAMPLE

Figure 8A:
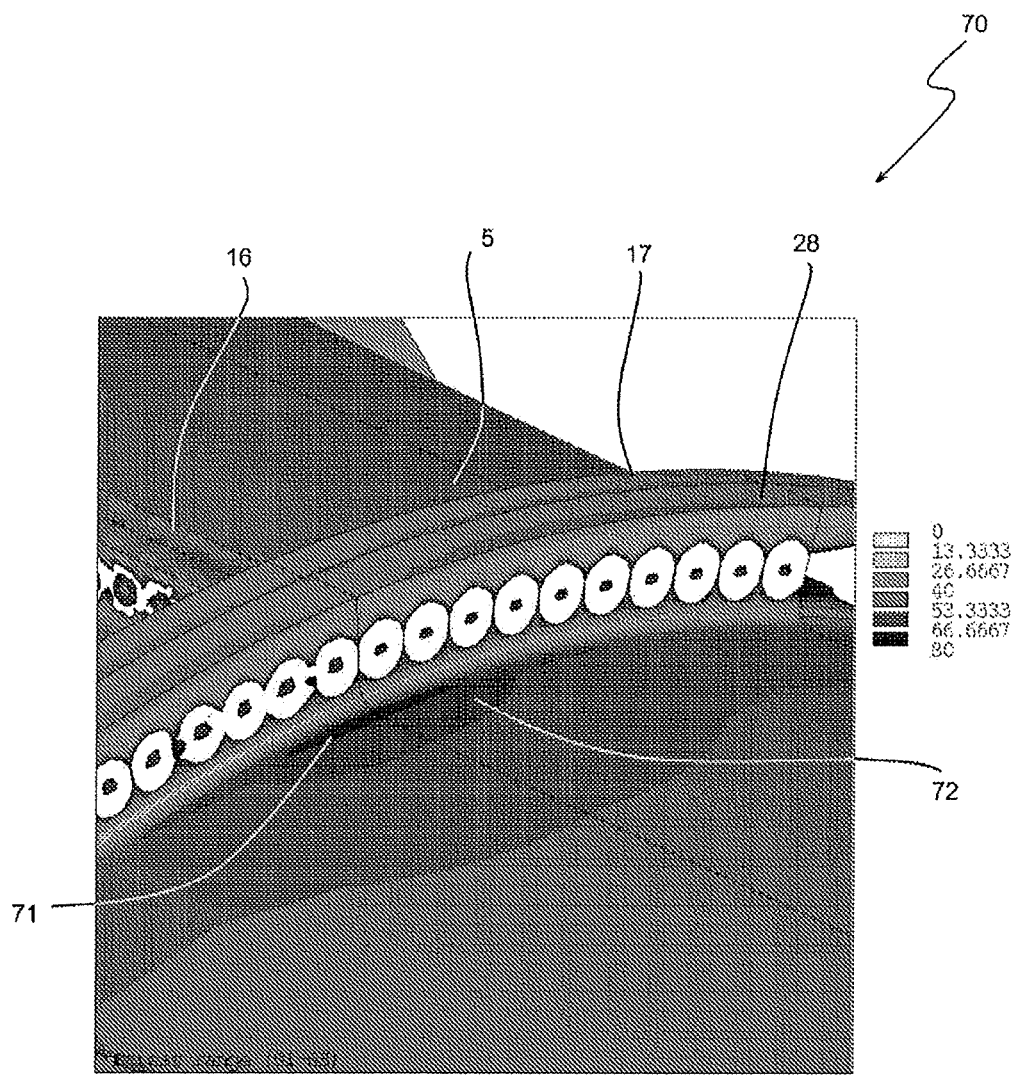
FIGS. 8A and 8B are finite element analysis graphs comparing the stress concentrations for a hard spot without and with a stress distribution element according to another embodiment of the invention.

FIG. 8A shows the maximum stress range in a typical mill shell joint 70 using FEA techniques. The joint 70 comprises a split longitudinal flange 16 that joins a split circumferential flange 17, which is composed of two circumferential flanges 28 of adjoining mill shell sections 5. The hard spot 71 occurs at the junction of the split longitudinal flange 16 and split circumferential flange 17, where there is a stress range of about 85 MPa. The area 72 surrounding the hard spot has a stress range of around 65 MPa.

Figure 8B:
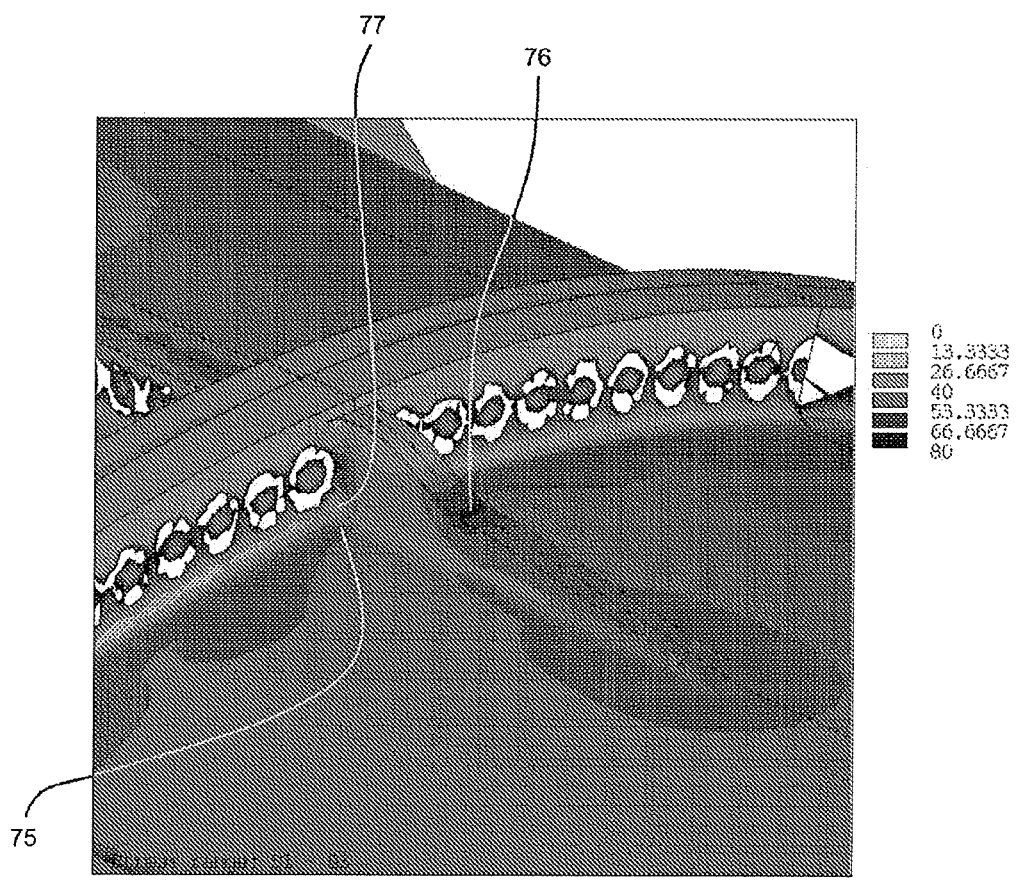

In comparison, FIG. 8B shows the stresses where the dummy flange 20 is connected to the joint 70. The stress range 75 in the weld radius, where the hard spot would have been is now about 52.5 MPa. The dummy flange 20 has distributed the stress forces from the hard spot along its length such that there is a small area 76 where the stress is about 80 MPa, comparable to the hard spot of FIG. 8A, but in an area with no welds. Likewise, in the mill shell section 5 there is only a stress range of less than 30 MPa, away from the welded areas and where the allowable stress range is 78 MPa. Using the dummy flange thus results in a mill shell design that complies with the 53 MPa allowable limit that is derived from British Standard 7608, but is generally accepted as an industry standard. Thus, the use of a dummy flange minimises the risk of hard spots increasing fatigue in the mill shell section, and hence mill shell cracking and failure. Accordingly, mill shell sections can be manufactured with a reduced thickness, reducing mill shell mass, associated manufacturing costs and wastage of material.

In each of the embodiments described above, the elongated body of the dummy flange has a rib-like or fin-like profile. However, other profiles can be used, such as a partly curved or sinuous profile, as best shown in FIGS. 9A and 9B. In FIG. 9A, the dummy flange 80 has an elongated body 80 with a partly curved section 82, creating a partly curved profile. Similarly, in FIG. 9B, the dummy flange 84 has an elongated body 85 with a sinuous portion 86, creating a partly sinuous profile. In a further preferred form as best shown in FIG. 11, the dummy flange 100 has an elongated body 21, similar to the above described embodiments, from which extend additional elongated bodies 101 of shorter length like branches from a tree trunk. The "branches" 101 can be arranged symmetrically about the "trunk" 21 (as shown by the lowest pair of branches in FIG. 11) or offset to each other (as shown by the highest pair of branches in FIG. 11).

In other preferred forms, the invention provides a stress distribution assembly for a joint of a mill shell, comprising a hub and a plurality of stress distribution elements of the first aspect of the present invention, wherein said hub is joined to the respective proximal ends of each said stress distribution element, said hub being connectable to said mill shell joint. In this preferred form, the hub acts as an intermediate connecting element to connect the stress distribution elements to the mill shell joint as well as a central connection for the stress distribution elements. The hub may be substantially linear and extend substantially orthogonal to the stress distribution elements. As best shown in FIG. 10A, the stress distribution assembly 90 has a linear hub 91 to which the respective proximal ends 22 of the dummy flanges 60a, 60b, 60c of FIGS. 6A to 7B are connected, and the hub 91 is then connected to the circumferential flange 28. Alternatively, the hub is bulbous or semi-hemispherical, with the stress distribution elements extending divergently or radially outward from the hub, like rays from the sun. As best shown in FIG. 10B, the stress distribution assembly 95 has a hemispherical hub 96 to which the respective proximal ends 22 of the dummy flanges 97 are connected, with the hub 96 connected to the circumferential flange 28.

It will further be appreciated that any of the features in the preferred embodiments of the invention can be combined together and are not necessarily applied in isolation from each other. For example, the stress distribution system illustrated in FIGS. 6A to 7B may have dummy flanges of different types together, such as the dummy flange 40 of FIGS. 4A to 4C having a reduced width and the dummy flange 95 of FIG. 10B having a partly sinuous profile.

Also, while the preferred embodiment of the invention have been described in relation to longitudinal and circumferential flanges of a mill shell, it will be appreciated that each of the aspects of the invention and the corresponding preferred features are also applicable to flanges, joints and other non-axisymmetric features on other types of constructions and structures, such as industrial kilns.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

By providing a stress distribution element that reduces or eliminates hard spots that develop in the assembled mill shell, the invention ensures that mill shells can be designed with the optimum mill shell section thickness while still avoiding the risks associated with hard spots developing in the mill shell, thus minimising the risk of mill shell cracking and failure. Furthermore, as the mill shell section thickness can be optimised, the mill shell mass can be significantly reduced. There is also a reduction in manufacturing costs when using thinner mill shell sections and reduced wastage of material. Moreover, the profile of the stress distribution element in terms of its variable dimension (be it height and/or width) can be tailored using FEA techniques to different stresses caused by different characteristics in particular mill shells due to different thicknesses in the flanges (or other non-axisymmetric features), different materials of the mill shell section and other physical parameters. Also, the stress distribution element can be readily retrofitted on existing mill shells. In all these respects, the invention represents a practical and commercially significant improvement over the prior art.

Although the invention has been described with reference to specific examples, it will be appreciated by those skilled in the art that the invention may be embodied in many other forms.

The invention claimed is:
1. A mill shell comprising:
 a plurality of mill shell sections connected together, each of said mill shell sections having an arcuate outer surface one or more stress distribution elements comprising an elongated body with a proximal end, a distal end, and a height which step-wise decreases from said proximal end to said distal end to widely distribute stress from said proximal end to said distal end, wherein two of said mill shell sections each have respective linear flanges connected together to form a longitudinal flange extending parallel to a longitudinal axis of said mill shell and respective arcuate flanges connecting said two mill shell sections to a third mill shell section;

said third mill shell section comprising an arcuate flange directly connected to said respective arcuate flanges of said two mill shell sections to form a circumferential flange extending along the circumference of said mill shell, and wherein said longitudinal flange and said circumferential flange are connected to each other to form a mill shell joint and said proximal end of each said stress distribution element is connected to said mill shell joint to distribute stress forces from said mill shell joint.

2. The mill shell of claim 1, wherein said proximal end of each said stress distribution element is connected to said mill shell joint so that the longitudinal axis of said elongated body of said at least one stress distribution element is coincident with or parallel to the longitudinal axis of said longitudinal flange.

3. The mill shell of claim 2, wherein said elongated body of each said stress distribution element is connected to said third mill shell section.

4. The mill shell of 3, wherein said proximal end is connected to said circumferential flange.

5. The mill shell of claim 4, wherein said proximal end is connected to said circumferential flange at one side opposite to said longitudinal flange.

6. The mill shell of claim 5, wherein said proximal end is connected to a junction between said longitudinal flange and said circumferential flange.

7. A method of distributing stress from a joint of a mill shell comprising a plurality of mill shell sections connected together, wherein two of said mill shell sections each have respective linear flanges connected together to form a longitudinal flange extending parallel to a longitudinal axis of said mill shell and respective arcuate flanges connecting said two mill shell sections to a third mill shell section, said third mill shell section comprising an arcuate flange directly connected to said respective arcuate flanges of said two mill shell sections to form a circumferential flange extending along the circumference of said mill shell, wherein said longitudinal flange and said circumferential flange are connected to each other to form a mill shell joint, said method comprising:

connecting one or more stress distribution elements comprising an elongated body with a proximal end, a distal end, and a height which step-wise decreases from said proximal end to said distal end to widely distribute stress from said proximal end to said distal end, by their respective proximal ends to said mill shell joint.

* * * * *